United States Patent
Boucher

(10) Patent No.: US 8,578,389 B1
(45) Date of Patent: Nov. 5, 2013

(54) METHOD AND SYSTEM FOR MERGING DIRECTED ACYCLIC GRAPHS REPRESENTING DATA FLOW CODES

(75) Inventor: Michael L. Boucher, Lafayette, CO (US)

(73) Assignee: Oracle America, Inc., Redwood City, CA (US)

( * ) Notice: Subject to any disclaimer, the term of this patent is extended or adjusted under 35 U.S.C. 154(b) by 1345 days.

(21) Appl. No.: 10/837,607

(22) Filed: May 4, 2004

(51) Int. Cl.
*G06F 9/46* (2006.01)
*G06F 9/45* (2006.01)

(52) U.S. Cl.
USPC ........... 718/106; 718/102; 717/148; 717/144; 717/156

(58) Field of Classification Search
USPC ............................................. 718/1, 100–108
See application file for complete search history.

(56) References Cited

U.S. PATENT DOCUMENTS

| | | | | |
|---|---|---|---|---|
| 5,742,821 | A * | 4/1998 | Prasanna ...................... | 718/102 |
| 6,141,792 | A * | 10/2000 | Acker et al. .................. | 717/116 |
| 6,393,433 | B1 * | 5/2002 | Kalavade et al. ............. | 707/200 |
| 6,442,584 | B1 * | 8/2002 | Kolli et al. ................... | 718/104 |
| 2002/0129343 | A1 * | 9/2002 | Pinter et al. .................. | 717/140 |
| 2002/0165701 | A1 * | 11/2002 | Lichtenberg et al. ......... | 703/7 |
| 2004/0015814 | A1 * | 1/2004 | Trappen et al. ............... | 717/100 |
| 2004/0019599 | A1 * | 1/2004 | Trappen et al. ............... | 707/102 |
| 2005/0102386 | A1 * | 5/2005 | Mills et al. ..................... | 709/223 |
| 2007/0271554 | A1 * | 11/2007 | Fletcher et al. ............... | 717/147 |

OTHER PUBLICATIONS

Cosnard, Michel et al. "Compact DAG Representation and Its Dynamic Scheduling." Journal of Parallel and Distributed Computing. 1999.*
Su, Alan et al. "Utilizing DAG Scheduling Algorithms for Entity-Level Simulations." Proc. High Performance Computing Symposium 2002.*
Pande, Santosh et al. "A Scalable Scheduling Scheme for Functional Parallelism on Distributed Memory Multiprocessor Systems." IEEE. Apr. 1995.*

* cited by examiner

*Primary Examiner* — Abdullah Al Kawsar
(74) *Attorney, Agent, or Firm* — Marsh Fischmann & Breyfogle, LLP; Jon P. Deppe; Kent A. Lembke

(57) ABSTRACT

Methods and systems facilitating a programmer to program parts of a program in data flow programming to produce directed acyclic graphs ("DAGs"), and then merge the graphs at runtime for efficiency and scalability. Large merged DAG can typically be processed with greater efficiency than the collection of smaller DAGs. As a result, smaller DAGs may be created while the execution of the program realizes the increased efficiency of executing a larger DAG based on the merging of the smaller DAGs. In accordance with methods and systems consistent with the present invention, a programmer creates individual data flow directed acyclic graphs in a program.

12 Claims, 3 Drawing Sheets

METHOD AND SYSTEM FOR MERGING DIRECTED ACYCLIC GRAPHS REPRESENTING DATA FLOW CODES

BACKGROUND

1. Field of the Invention

The present invention generally relates to data flow programming and directed acyclic graphs. In particular, the present invention generally relates to the merging of directed acyclic graphs in a data flow programming environment at runtime.

2. Background

Multiprocessor computer systems include two or more processors that may be employed to execute the various instructions of a computer program. A particular set of instructions may be performed by one processor while other processors perform unrelated sets of instructions.

Fast computer systems, like multiprocessor computer systems, have stimulated the rapid growth of a new way of performing scientific research. The broad classical branches of theoretical science and experimental science have been joined by computational science. Computational scientists simulate on supercomputers phenomena too complex to be reliably predicted by theory and too dangerous or expensive to be reproduced in a laboratory. Successes in computational science have caused demand for supercomputing resources to rise sharply in recent years.

During this time, multiprocessor computer systems, also referred to as "parallel computers," have evolved from experimental contraptions in laboratories to become the everyday tools of computational scientists who need powerful computing resources in order to solve their problems. Several factors have stimulated this evolution. It is not only that the speed of light and the effectiveness of heat dissipation impose physical limits on the speed of a single processor. It is also that the cost of advanced single-processor computers increases more rapidly than their power. In addition, price/performance ratios become more favorable if the required computational power can be found from existing resources instead of purchased. This factor has caused many sites to use existing work station networks, originally purchased to do modest computational chores, as "SCAN"s (SuperComputers At Night) by utilizing the workstation network as a parallel computer. This scheme has proven successful enough, and the cost effectiveness of individual workstations has increased rapidly enough, that networks of workstations have been purchased to be dedicated to parallel jobs that used to run on more expensive supercomputers. Thus, considerations of both peak performance and price/performance are pushing large-scale computing in the direction of parallelism. Despite these advances, parallel computing has obstacles to its adoption.

One obstacle to the adoption of parallel computing and its benefits in economy and power is the problem of inadequate software. The developer of a program implementing a parallel algorithm for an important computational science problem may find the current software environment to be more of an obstruction than smoothing the path to use of capable, cost-effective hardware available. This is because computer programmers generally follow a "control flow" model when developing programs, including programs for execution by multiprocessor computers systems. According to this model, the computer executes a program's instructions sequentially (i.e., in a series from the first instruction to the last instruction) as controlled by a program counter. Although this approach tends to simplify the program development process, it is inherently slow.

For example, when the program counter reaches a particular instruction in a program that requires the result of another instruction or set of instructions, the particular instruction is said to be "dependent" on the result and the processor cannot execute that instruction until the result is available. Moreover, executing programs developed under the control flow model on multiprocessing computer systems results in a significant waste of resources because of these dependencies. For example, a first processor executing one set of instructions in the control flow program may have to wait for some time until a second processor completes execution of another set of instructions, the result of which is required by the first processor to perform its set of instructions. This wait-time translates into an unacceptable waste of computing resources in that at least one of the processors in this two-processor configuration is idle the whole time while the program is running.

To better exploit parallelism in a program some scientists have suggested use of a "data flow" model in place of the control flow model. The basic concept of the data flow model is to enable the execution of an instruction whenever its required operands become available, and thus, no program counters are needed in data-driven computations. Instruction initiation depends on data availability, independent of the physical location of an instruction in the program. In other words, instructions in a program are not ordered. The execution simply follows the data dependency constraints.

Programs for data-driven computations can be represented by data flow graphs. For example, consider the calculation of the following expression:

$$z=(x+y)*2$$

When, for example, x is 5 and y is 3, the result z is 16. In this example, z is dependent on the result of the sum and x and y. The data flow graph is a directed acyclic graph ("DAG") whose nodes correspond to operators and arcs are pointers for forwarding data. The graph demonstrates sequencing constraints (i.e., constraints with data dependencies) among instructions. FIG. 4a, described below, illustrates two exemplary DAGs.

For example, in a conventional computer, program analysis is often done (i) when a program is compiled to yield better resource utilization and code optimization, and (ii) at run time to reveal concurrent arithmetic logic activities for higher system throughput. For instance, consider the following sequence of instructions:

1. P=X+Y
2. Q=P/Y
3. R=X*P
4. S=R−Q
5. T=R*P
6. U=S/T

The following five computational sequences of these instructions are permissible to guarantee the integrity of the result when executing the instructions on a serial computing system (e.g., a uniprocessor system):

1,2,3,4,5,6
1,3,2,5,4,6
1,3,5,2,4,6
1,2,3,5,4,6
1,3,2,4,5,6

For example, the first instruction must be executed first, but the second or third instruction can be executed second, because the result of the first instruction is required for either the second or third instruction, but neither the second nor the third requires the result of the other. The remainder of each sequence follows the rule that no instruction can be run until its operands (or inputs) are available.

In a multiprocessor computer system with two processors, however, it is possible to perform the six operations in four steps (instead of six) with the first processor computing step 1, followed by both processors simultaneously computing steps 2 and 3, followed by both processors simultaneously steps 4 and 5, and finally either processor computing step 6. This is an improvement over the uniprocessor approach because execution time is reduced.

Data-flow style programming typically yields the most parallelism of various programming modes, but using data-flow programming optimally typically requires programming large parts of the program in that style. Unfortunately, it is generally preferable to program small parts of a program in the data flow format because it is easier to write and easier to maintain the resulting program. It may be desirable to write small modules in the data flow style and then combine them into a large program that appears as if it were written as a single data flow program. Unfortunately, it is difficult to use the easier programming style of creating many small modules and then merge them together into the large single module that is useful for peak performance.

Therefore, a need has long existed for a method and system that overcome the problems noted above and other related problems.

SUMMARY

Methods and systems consistent with the present invention allow a programmer to program parts of a program in data flow programming to produce directed acyclic graphs, and then merge the graphs at runtime for efficiency and scalability. The single merged directed acyclic graph may then be executed.

In one implementation, a method in a data processing system is provided comprising the steps of generating directed acyclic graphs representing executable tasks and dependencies between the executable tasks, and merging the directed acyclic graphs at runtime to create a merged directed acyclic graph.

In another implementation, a data processing system is provided comprising a memory storing a program that generates directed acyclic graphs representing executable tasks and dependencies between the executable tasks, and merges the directed acyclic graphs at runtime to create a merged directed acyclic graph. The data processing system further comprises a processor for running the program.

In yet another implementation, a computer-readable medium is provided containing instructions for controlling a data processing system to perform a method, the method comprising the steps of generating directed acyclic graphs representing executable tasks and dependencies between the executable tasks, and merging the directed acyclic graphs at runtime to create a merged directed acyclic graph.

BRIEF DESCRIPTION OF THE DRAWINGS

The accompanying drawings, which are incorporated in and constitute a part of this specification, illustrate embodiments in accordance with methods and systems consistent with the present invention and, together with the description, serve to explain the advantages and principles consistent with the present invention.

DETAILED DESCRIPTION

Figure 1:
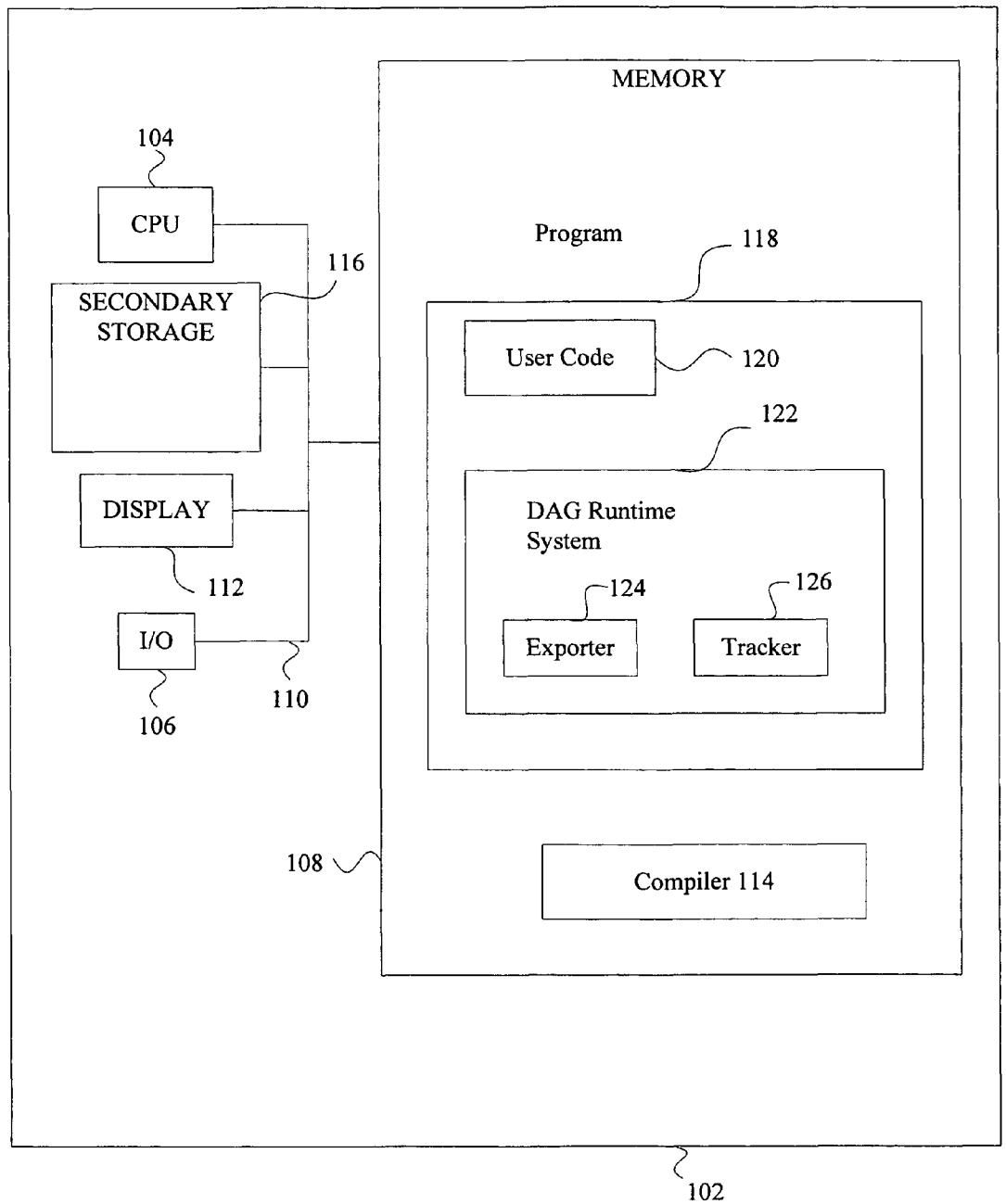
FIG. 1 depicts an exemplary data processing system suitable for use in accordance with methods and systems consistent with the present invention.

Methods and systems consistent with the present invention allow a programmer to program parts of a program in data flow programming to produce directed acyclic graphs, and then merge the graphs at runtime for efficiency and scalability. The larger merged DAG can typically be processed with greater efficiency than the collection of smaller DAGs. As a result, the programmer is able to easily create smaller DAGs while the execution of the program realizes the increased efficiency of executing a larger DAG based on the merging of the smaller DAGs.

In accordance with methods and systems consistent with the present invention, a programmer may create individual subprograms each written to execute by generating a directed acyclic graph and then execute that graph. The programmer may insert a call to an exemplary function "begin_dag" that indicates the beginning of the set of such subprograms that are to be merged. The programmer may also insert a call to an exemplary function "end_dag" that indicates the end of the set of subprograms to be merged. When the program is run, the DAGs between the functions begin_dag and end_dag are collected and merged, and the larger merged DAG is then executed.

The DAGs may be merged by various means of merging the DAGs. In one embodiment, a subprogram creates a DAG at run-time by calling support subprograms such as an exemplary function "add_node_to_dag." When used with an individual function, add_node_to_dag adds a node to the DAG for the calling subprogram. When used with methods and systems consistent with the present invention, add_node_to_dag performs similarly unless it determines that it is within the scope of a begin_dag/end_dag pair. In that case, it adds the node into a larger DAG representing the execution of the larger set of subprograms. The function add_node_to_dag may also record ancillary information that simplifies the process of creating, validating, or executing a multi-subprogram DAG. For example, one such note could be that certain variables are local variables in a particular function, which means that they could not be linked to DAGs that arise from other functions. When merging the two DAGs, the merge operation knows that it does not need to check for dependencies involving those variables. The ancillary information could also note that certain variables are used as scratch workspace, meaning that subsequent DAG nodes that use the same variable name need not depend on the contents of the variable.

In another embodiment, a run-time system may observe at run-time that multiple DAGs are being created by the executing program and may merge the DAGs either as they are being created or after the DAGs are assembled.

In yet another embodiment, the DAG run-time system may keep separate DAGs but present to the running program the illusion that the DAGs are merged. DAG execution proceeds by having the program ask the DAG run-time system for work represented by nodes in the DAG. The DAG run-time system responds to requests for work by returning a node that has no unsatisfied dependencies. In this implementation, the DAG runtime system may maintain an arbitrary number of distinct DAGs and then return work to the running program by analyzing the separate DAGs and returning work in a way that is consistent with a set (possibly comprising only one member) of merged DAGs.

FIG. 1 depicts an exemplary data processing system suitable for use in accordance with methods and systems consistent with the present invention. FIG. 1 shows a computer 102 which may be connected to a network, which may be wired or wireless, and may be a LAN or WAN, and the computer may represent any kind of data processing device, such as a general-purpose data processing device, a personal computer, a plurality of interconnected data processing devices, video game console, clustered server, a mobile computing device, a personal data organizer, a mobile communication device including mobile telephone or similar devices. The computer 102 may represent a computer in a distributed environment, such as on the Internet. There may also be more computers 102 than shown on the figure.

A computer 102 may include a central processing unit ("CPU") 104, an input-output ("I/O") unit 106 such as a mouse or keyboard, or a graphical input device such as a writing tablet, and a memory 108 such as a random access memory ("RAM") or other dynamic storage device for storing information and instructions to be executed by the CPU. The computer 102 also includes a secondary storage device 116 such as a magnetic disk or optical disk that may communicate with each other via a bus 100 or other communication mechanism. The computer 102 may also include a display 112 such as a cathode ray tube ("CRT") or LCD monitor, and an audio/video input (not shown) such as a webcam and/or microphone.

Although aspects of methods and systems consistent with the present invention are described as being stored in memory 108, one having skill in the art will appreciate all or part of methods and systems consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the data processing system are described, one skilled in the art will appreciate that a data processing system suitable for use with methods, systems, and articles of manufacture consistent with the present invention may contain additional or different components. The computer 102 may include a human user or may include a user agent. The term "user" may refer to a human user, software, hardware or any other entity using the system.

As shown, the memory 108 in the computer 102 may include a compiler 114 which translates the program from a human-readable form into a machine-readable form. It may translate it to object code or executable code or may also translate it to a byte code for interpretation by an interpreter, e.g., Java, or into other forms intended to be translated by a subsequent component into executable code.

The program 118 running in memory 108 can be a combination of user code 120 and code to support execution of the DAG. Code to support execution of the DAG, referred to the DAG run-time system 122, includes an exporter component 124 that distributes work to subroutines that request it and a tracker component 126 that records the fact that certain units of work are complete. As part of recording that a unit of work is complete, the tracker component 126 updates the DAG to note that any dependencies represented by the completed work unit have been satisfied. This may make other units of work eligible for execution. The DAG run-time system 122 may also perform the merging of DAGs.

Although only one compiler 114 is shown, any number of compilers 114 or other components may be used. Additionally, although shown on the computer 102 in the memory 108, these components may reside elsewhere, such as in the secondary storage 116, or on another computer, such as another computer 102. Furthermore, these components may be hardware or software whereas embodiments in accordance with the present invention are not limited to any specific combination of hardware and/or software. The system may be implemented in any way, in software or hardware or a combination thereof, and may be distributed among many computers. It may represented by any number of components, processes, threads, etc.

Computers 102 may communicate directly or over networks, and may communicate via wired and/or wireless connections, including peer-to-peer wireless networks, or any other method of communication. Communication may be done through any communication protocol, including known and yet to be developed communication protocols. The network may comprise many more computers 102 and than those shown on the figure, and the devices may also have additional or different components than those shown.

It will be appreciated that various modifications to detail may be made to the embodiments as described herein. Further, it is noted that a computer-readable medium may be provided having a program embodied thereon, where the program is to make a computer or system of data processing devices execute functions or operations of the features and elements of the above described examples. A computer-readable medium may include a magnetic or optical or other tangible medium on which a program is embodied, but can also be a signal, (e.g., analog or digital), electromagnetic or optical, in which the program is embodied for transmission. Further, a computer program product may be provided comprising the computer-readable medium.

Figure 2:
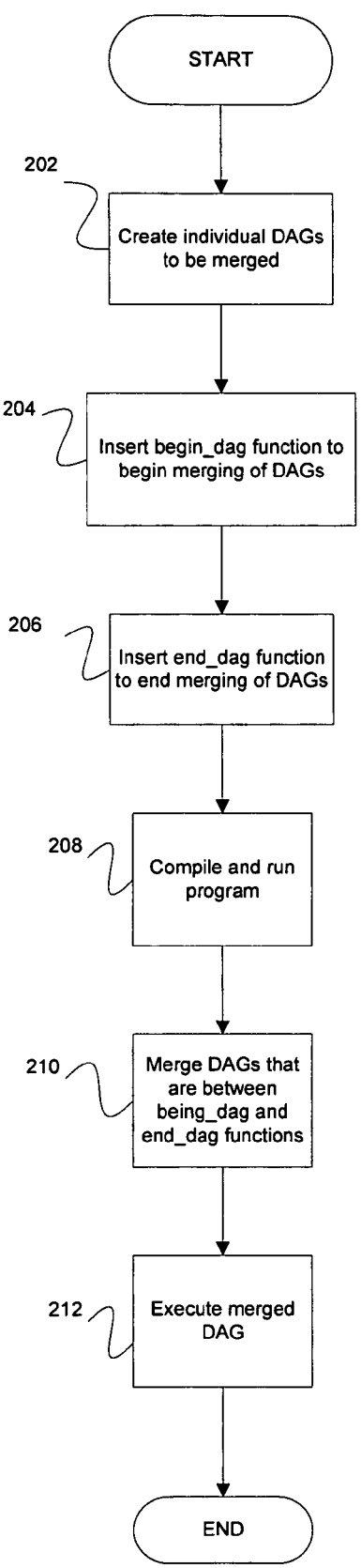
FIG. 2 depicts a flowchart of an exemplary method for creating, designating and merging DAGs at runtime in accordance with the present invention.

FIG. 2 depicts a flowchart of an exemplary method for creating, designating and merging DAGs at runtime in accordance with the present invention. First, the programmer creates individual DAGs to be merged (step 202). Then the programmer inserts, before the first DAG to be merged, a call to a function, i.e., begin_dag, that will begin the merging of the DAGs (step 204). At the end of the individual DAGs to be merged, the programmer inserts a call to a function that ends the merging of the DAGs, i.e., end_dag (step 206). The program 118 is compiled by the compiler 114 and run (step 208), and when the begin_dag statement is executed, the individual DAGs down to the end_dag statement are collected and merged at runtime (step 210). The merged DAG is then executed (step 212).

Whereas a DAG may be a graph that represents executable tasks and the dependencies between them indicating what should be done before an executable task can be executed, the availability of data controls when a particular executable task gets done. Consider the code below:

Step 1. $a=b+c+z$
Step 2. $d=c+e+x$
Step 3. $f=a+g$
Step 4. $c=7$

Steps 1 and 2 are independent with respect to each other, and either can execute before the other or they can execute in parallel. They can even execute in a merged order with b+c being computed from Step 1, then c+e computed in Step 2 before z is added to the sum of b+c in support of Step 1. Step 2 is also independent of Step 3. However, Step 3 cannot proceed until Step 1 is done because it uses the result of Step 1 (the value of a). Step 4 does not depend on the results of any previous steps, but it is still dependent on Step 1 and Step 2 because it must not write a 7 into the variable c until the previous value of c is used by Step 1 and Step 2.

The DAG for the foregoing would have 4 nodes, one for each step. The nodes would be connected by arcs indicating dependencies. There would be an arc from 1 to 3 indicating that Step 1 must complete before Step 3 begins. There are also arcs from 1 to 4 and 2 to 4. There are no arcs between 1 and 2 or between 3 and 4, so those steps may be performed in any order relative to each other.

Figure 3:
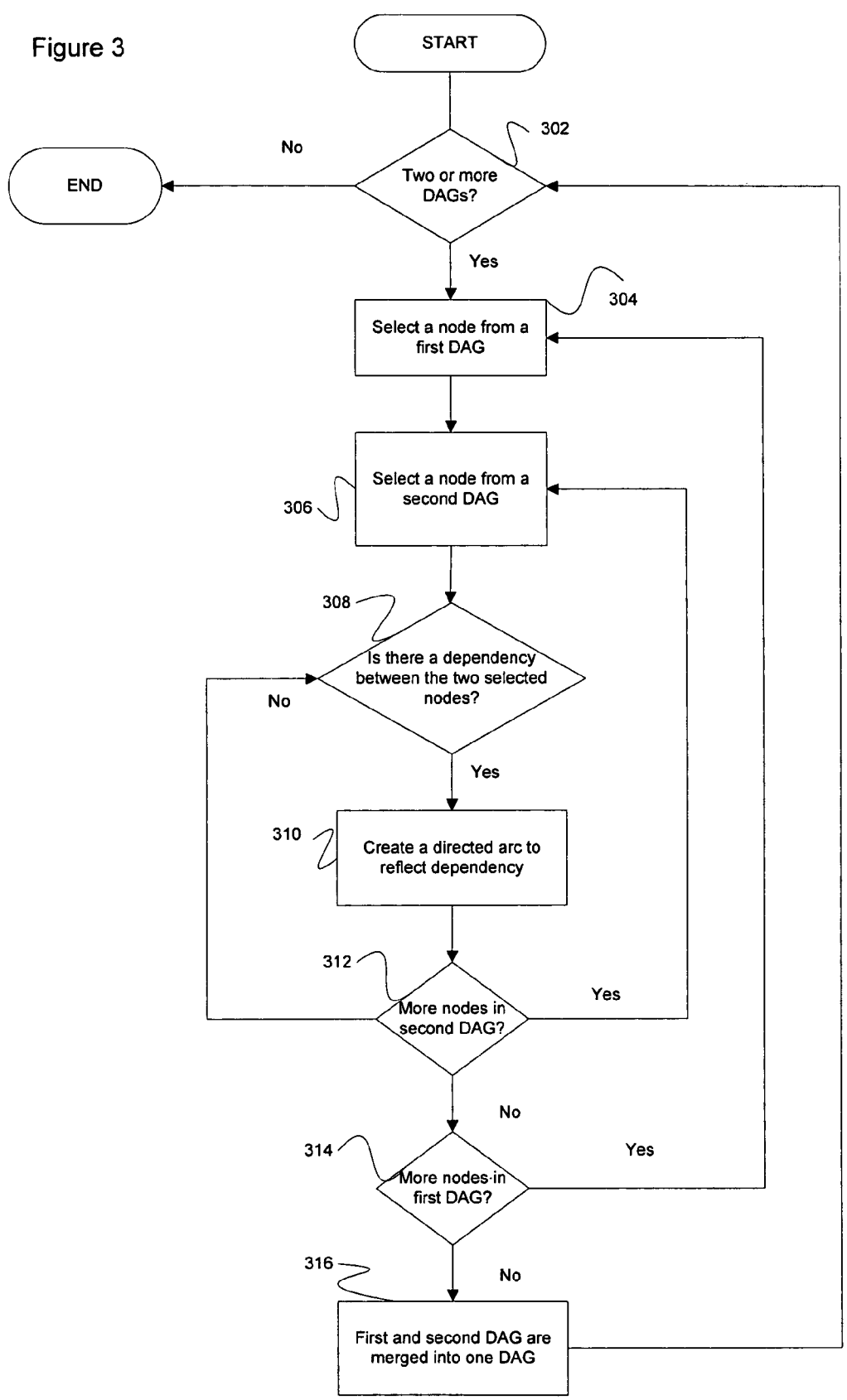
FIG. 3 depicts a flowchart of an exemplary method for merging individual DAGs into a merged DAG.

FIG. 3 depicts a flowchart of an exemplary method for merging individual DAGs into a merged DAG. To merge two DAGs, each node in a DAG is compared with each node in a second DAG to determine if first there are any dependencies between the two. If there are any dependencies, a directed arc is created to reflect the dependency.

If there are two or more DAGs to be merged (step 302), a node is selected from a first DAG (step 304). Then, a node is selected from a second DAG (step 306) to be compared with the node that was selected from the first DAG. The system determines whether there is a dependency between the two nodes (step 308). If there is a dependency between the two selected nodes, the system creates a directed arc to reflect the dependency (step 310). If there are more nodes in the second DAG to be compared with the first selected node in the first DAG (step 312), then a new node from the second DAG is selected (step 306). Once the nodes in the second DAG are compared to the first node of the first DAG, it is determined whether there are more nodes in the first DAG to compare (step 314). If so, a new node from the first DAG is selected (step 304), and a new node from the second DAG is selected (step 306). If not, in one implementation, all nodes in the first DAG and second DAG have been compared and arcs have been created for all dependencies. As a result, the first and second DAG are merged into one DAG (step 316). If there are more DAGs to merge, in one implementation, the process may begin by merging the new larger DAG with an additional DAG (step 302). If not, all DAGs have been merged into a single larger merged DAG. Finally, this merged DAG may then be executed. In one implementation, the merged DAG may begin execution while it is being constructed by executing nodes that will not change.

Consider two exemplary DAGs before merging and after merging, a first DAG A having various nodes including nodes 1 and 2, and the dependencies between the nodes of the DAG, and a second DAG B having various nodes including nodes 3 and 4 and the dependencies between the nodes of the DAG. In these two DAGs A and B, node 1 depends on the completion of node 3 and node 2 depends on the completion of node 4.

An exemplary merged DAG C, when DAGs A and B have merged in accordance with methods and systems consistent with the present invention as discussed above, in one implementation, is produced having the dependency between nodes 1 and 3, as well as the dependency between 2 and 4. The merged DAG C is a single DAG including the two original DAGs A and B and their dependencies.

In another embodiment, an auxiliary data structure is maintained for every source of dependency that indicates every node that uses that particular source. Consider the following:

Step 1: ab=10
Step 2: cd=ef+gh
Step 3: ef=ab+cd
Step 4: cd=cf+cd

The data structure for the variable ab would indicate that only Steps 1 and 3 use ab. Therefore, when looking for dependencies based on ab, only Steps 1 and 3 need to be considered, which may save time. Data structures maybe created for all sources of dependency. This includes overt dependencies such as variables but also hidden dependencies such as file pointers and other system states.

The foregoing description of an implementation in accordance with methods and systems consistent with the present invention has been presented for purposes of illustration and description. It is not exhaustive and does not limit the invention to the precise form disclosed. Modifications and variations are possible in light of the above teachings or may be acquired from practice. Note also that the implementation may vary between systems. Methods and systems in accordance with the present invention may be implemented with both object-oriented and non-object-oriented programming systems.

What is claimed is:

1. A method in a data processing system, comprising the steps of:
    generating a plurality of individual directed acyclic graphs, wherein each of the plurality of individual directed acyclic graphs comprise a plurality of nodes representing executable tasks and each of the plurality of individual directed acyclic graphs comprise dependencies between the plurality of nodes representing the executable tasks;
    merging the individual directed acyclic graphs at runtime to create a merged directed acyclic graph, wherein the merged directed acyclic graph includes at least one dependency between nodes from different individual directed acyclic graphs wherein the step of merging the individual directed acyclic graphs at runtime further comprises:
        comparing a node in a first one of the individual directed acyclic graphs with a node in a second one of the individual directed acyclic graphs to determine if there is a merged dependency between the compared nodes, and
        creating a directed arc in the merged directed acyclic graph to reflect the merged dependency, wherein the merged dependency did not exist in the first one or the second one of the individual directed acyclic graphs individually; and
    executing the merged directed acyclic graph while the merged directed acyclic graph is being constructed.

2. The method of claim 1, further comprising the steps of:
    inserting a first function in a program to indicate a first of the generated individual directed acyclic graphs to be merged; and
    inserting a second function in the program to indicate a last of the individual generated directed acyclic graphs to be merged.

3. The method of claim 2, wherein the step of merging the individual directed acyclic graphs at runtime further comprises the step of:
    merging at runtime the individual directed acyclic graphs between the indicated first individual directed acyclic graph and last individual directed acyclic graph.

4. The method of claim 1, wherein the comparing step further includes:
    comparing each node in the first one of the individual directed acyclic graphs with each node in the second one of the individual directed acyclic graphs to determine if there are dependencies between the compared nodes.

5. A data processing system, comprising:
    a memory storing a program that:
        generates a plurality of individual directed acyclic graphs, wherein each of the plurality of individual directed acyclic graphs comprise a plurality of nodes representing executable tasks and each of the plurality of individual directed acyclic graphs comprise dependencies between plurality of nodes representing the executable tasks, merges the individual directed acyclic graphs at runtime to create a merged directed acyclic graph, wherein the merged directed acyclic graph includes at least one dependency between nodes from different individual directed acyclic graphs, and compares a node in a first one of the individual directed acyclic graphs with a node in a second one of the individual directed acyclic graphs to determine if there is a merged dependency between the compared nodes, and creates a directed arc in the merged directed acyclic graph to reflect the merged dependency, wherein the merged dependency did not exist in the first one or the second one of the individual directed acyclic graphs individually; and a processor for running the program, wherein the program further executes the merged directed acyclic graph while the merged directed acyclic graph is being constructed.

6. The data processing system of claim 5, further including a second program having a first function in the second program to indicate a first of the generated individual directed acyclic graphs to be merged, and a second function in the second program to indicate a last of the generated individual directed acyclic graphs to be merged.

7. The data processing system of claim 6, wherein the program further merges at runtime the individual directed acyclic graphs between the indicated first individual directed acyclic graph and last individual directed acyclic graph.

8. The data processing system of claim 5, wherein the program further compares each node in the first one of the individual directed acyclic graphs with each node in the second one of the individual directed acyclic graphs to determine if there are dependencies between the compared nodes.

9. A tangible, non-transitory computer-readable medium containing instructions for controlling a data processing system to perform a method, the method comprising the steps of:

generating a plurality of individual directed acyclic graphs, wherein each of the plurality of individual directed acyclic graphs comprise a plurality of nodes representing executable tasks and each of the plurality of individual directed acyclic graphs comprise dependencies between the plurality of nodes representing the executable tasks; and merging the individual directed acyclic graphs at runtime to create a merged directed acyclic graph, wherein the merged directed acyclic graph includes at least one dependency between nodes from different individual directed acyclic graphs;

comparing each node in a first one of the individual directed acyclic graphs with each node in a second one of the individual directed acyclic graphs to determine if there are merged dependencies between the compared nodes;

creating a directed arc in the merged directed acyclic graph to reflect the merged dependency, wherein the merged dependency did not exist in the first one or the second one of the individual directed acyclic graphs individually; and executing the merged directed acyclic graph while the merged directed acyclic graph is being constructed.

10. The computer-readable medium of claim 9, wherein the method further comprises the steps of:

inserting a first function in a program to indicate a first of the generated individual directed acyclic graphs to be merged; and inserting a second function in the program to indicate a last of the generated individual directed acyclic graphs to be merged.

11. The computer-readable medium of claim 10, wherein the step of merging the individual directed acyclic graphs at runtime further comprises the step of:

merging at runtime the individual directed acyclic graphs between the indicated first individual directed acyclic graph and last individual directed acyclic graph.

12. A data processing system, comprising:

means for generating a plurality of individual directed acyclic graphs, wherein each of the plurality of individual directed acyclic graphs comprise a plurality of nodes representing executable tasks and each of the plurality of individual directed acyclic graphs comprise dependencies between the plurality of nodes representing the executable tasks; and means for merging the individual directed acyclic graphs at runtime to create a merged directed acyclic graph, wherein the merged directed acyclic graph includes at least one dependency between nodes from different individual directed acyclic graphs, wherein the means for merging the individual directed acyclic graphs at runtime is operable to:

compare a node in a first one of the individual directed acyclic graphs with a node in a second one of the individual directed acyclic graphs to determine if there is a merged dependency between the compared nodes, and create a directed arc in the merged directed acyclic graph to reflect the merged dependency, wherein the merged dependency did not exist in the first one or the second one of the individual directed acyclic graphs individually; and means for executing the merged directed acyclic graph while the merged directed acyclic graph is being constructed.

* * * * *